US007524150B2

(12) United States Patent
Zaiser et al.

(10) Patent No.: US 7,524,150 B2
(45) Date of Patent: Apr. 28, 2009

(54) ROUTER

(75) Inventors: Adolf Zaiser, Koengen (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/873,921

(22) Filed: Oct. 17, 2007

(65) Prior Publication Data

US 2008/0149222 A1 Jun. 26, 2008

(30) Foreign Application Priority Data

Dec. 22, 2006 (DE) ....................... 10 2006 061 235

(51) Int. Cl.
*B23C 1/20* (2006.01)

(52) U.S. Cl. ................................. 409/182; 144/136.95

(58) Field of Classification Search ......... 409/175–182, 409/235, 185; 144/154.5, 136.95; 384/43, 384/49

See application file for complete search history.

(56) References Cited

U.S. PATENT DOCUMENTS

| | | | | |
|---|---|---|---|---|
| 5,236,264 | A * | 8/1993 | Matsubara et al. | ............ 384/49 |
| 5,253,400 | A * | 10/1993 | Conachen | .................. 409/178 |
| 5,273,089 | A | 12/1993 | Fuchs et al. | |
| 6,505,659 | B1 | 1/2003 | Hummel | |
| 6,637,941 | B2 * | 10/2003 | Greiner | ....................... 384/43 |
| 2002/0168241 | A1 | 11/2002 | David et al. | |

FOREIGN PATENT DOCUMENTS

| | | |
|---|---|---|
| DE | 41 39 759 | 6/1993 |
| EP | 0 546 376 | 6/1993 |
| EP | 0 614 735 | 9/1994 |

* cited by examiner

*Primary Examiner*—Erica E Cadugan
(74) *Attorney, Agent, or Firm*—Michael J. Striker

(57) ABSTRACT

A router includes a motor housing, from the underside of which a tool fitting for a milling tool connected with a drive extends, and which includes a guide unit—with at least two guide columns—for the motor housing, which is displaceably accommodated on the first guide column in at least one bearing, and on the second guide column in at least a second bearing. The at least one bearing is designed at least partially as a rolling element guide.

8 Claims, 2 Drawing Sheets

ROUTER

CROSS-REFERENCE TO A RELATED APPLICATION

The invention described and claimed hereinbelow is also described in German Patent Application DE 102006061235.3 filed on Dec. 22, 2006. This German Patent Application, whose subject matter is incorporated here by reference, provides the basis for a claim of priority of invention under 35 U.S.C. 119(a)-(d).

BACKGROUND OF THE INVENTION

The present invention is directed to a router.

A generic router is made known in DE 41 39 759 A1. The router includes a motor housing, from the underside of which a tool fitting for a milling tool extends. The motor housing is connected with a base plate via two guide columns. The router includes a rod that cooperates with a rotary plate to roughly adjust the milling depth. To make fine adjustments of the milling depth, the motor housing may also be raised or lowered by small amounts relative to a guide column. This milling depth adjustment of the router is supported in a sliding manner.

SUMMARY OF THE INVENTION

It is therefore an object of the present invention to provide a router which is a further improvement of the existing routers.'

In keeping with these objects, the present invention in particular relates to a router which includes a motor housing, from the underside of which a tool fitting for a milling tool connected with a drive extends, and which includes a guide unit—with at least two guide columns—for the motor housing, which is displaceably accommodated on the first guide column in at least a first bearing, and on the second guide column in at least a second bearing.

It is provided in accordance with the present invention that at least one bearing is designed at least partially as a rolling element guide.

A design of this type makes it possible to adjust the milling depth of a router easily and precisely, since a rolling element guide also moves easily in the absence of play, i.e., with preload. With the rolling element guide, the motor housing and, therefore, the milling tool may be supported in a low-friction and jerkless manner, even without bearing play, thereby enabling the router to be adjusted quickly and accurately to a reference surface. Advantageously, the low-vibration guide of the milling tool results in greater dimensional stability and surface quality of the work piece to be machined, and it results in increased user-friendliness of the router, since its set-up time is thereby reduced.

In a further embodiment it is provided that the second bearing includes a rolling element guide and a sliding guide, thereby resulting in an advantageous stiffening of the motor housing via a non-rotatable positioning of the motor housing relative to the base plate.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
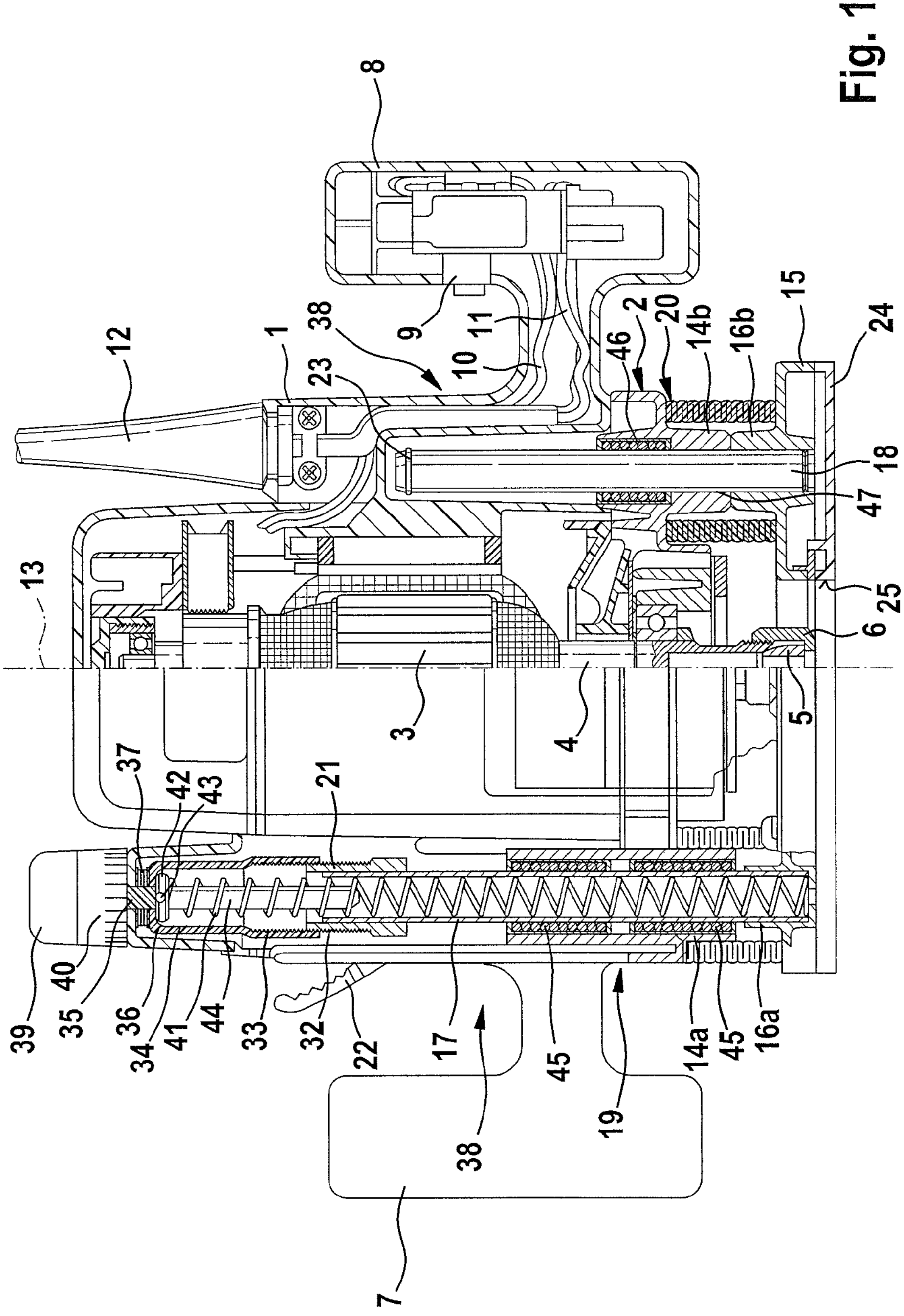
FIG. 1 shows a router in a partially exposed view, with a motor housing supported in a manner according to the present invention.

FIG. 1 shows an inventive router, in a partially exposed view. The router includes a two-piece motor housing, which is composed of an upper piece 1—preferably made of plastic—and a lower piece 2, which is preferably made of aluminum.

A drive motor 3, which starts a motor spindle 4 rotating, is located in motor housing 1, 2. Motor spindle 4 is non-rotatably connected with a tool fitting, preferably in the form of a clamping sleeve 5—which may be clamped using a hexagon nut 6—in which a milling tool may be clamped, in order to machine a work piece.

Two handles 7, 8 are installed on upper piece 1, and they are preferably integrally moulded with upper piece 1. An electrical switch 9 for starting the router is provided in one of the two handles 8. Switch 9 is connected via electric lines 10, 11 with drive motor 3 and a power connection cord 12.

First guide tubes 14*a, b*, which extend essentially parallel to a vertical axis 13 of the router and a vertical axis 13 of the milling tool, are integrally moulded with the lower piece of the motor housing. First guide tubes 14*a, b* line up directly with second guide tubes 16*a, b*, which are also oriented essentially parallel to a vertical axis 13 of the router and a vertical axis 13 of the milling tool, and which are integrally moulded with base plate 15.

Two guide columns 17, 18 of a guide unit 38 are guided and supported in first and second guide tubes 14*a, b* and 16*a, b*. A first guide column 17, as the main column, is hollow in design, and a second guide column 18 is solid in design. Motor housing 1, 2 is accommodated—such that it is displaceable essentially parallel to axis 13 of milling tool—on first guide column 17 in at least a first bearing 19, and on second guide column 18 in at least a second bearing 20, and it is detachably fixable in position relative to at least one of the guide columns 17, 18 using a clamping device 21, 22. A snap ring 23 is located in an annular groove on an upper end of solid guide column 18 facing upper piece 1; it prevents motor housing 1, 2 from accidentally sliding off of guide columns 17, 18. Solid guide column 18 prevents motor housing 1, 2 from rotating, and serves to limit the upper extent of the reciprocating motion.

Base plate 15 includes a lower piece 24—which is preferably composed of plastic—for protecting the work piece to be machined. Base plate 15 and lower piece 24 have a central opening 25, into which motor spindle 4 of drive motor 3 located in motor housing 1, 2 extends at least partially. According to FIG. 2, a rotary plate 27 with three adjustable screws 28 is installed on base plate 15, as a stop for a rod 26, for adjusting the milling depth. Rod 26 is fixed in position via a fixing screw 29, which has been inserted in a screw thread in lower piece 2 of the motor housing. To adjust the desired milling depth more easily, a scale 30 is provided on housing upper piece 1, and a displaceable sliding element 31 made of Plexiglas with a marking line is mounted on rod 26.

Motor housing 1, 2 is capable of being fixed in position relative to base plate 15 via the clamping device—in the form of a clamping sleeve 21—which is displaceably guided on main column 17, using a clamping screw 22. Clamping screw 22 is seated in a thread of clamping sleeve 21—which extends nearly at a right angle to the axis of main column 17—such that it is capable of being pressed against clamping sleeve 21. Clamping sleeve 21 includes an outer thread 32 on its outer circumference, onto inner thread 33 of which a stepped adjusting element 34—which is hollow-cylindrical in the lower section and which is preferably made of plastic—is screwed. Inner thread 33 has preload relative to outer thread 32, to eliminate thread play. This may be brought about, e.g., by using a slightly larger or smaller thread pitch, or by using a slightly overlapping thread profile.

The upper part of adjusting element 34 is designed as a full cylinder and forms a central neck 35. Housing upper piece 1 is located on shoulder 36 formed on the transition from the hollow-cylindrical piece to neck 35. An axial antifriction bearing 37 is inserted between shoulder 36 and housing piece 1. Housing piece 1 is fixed in position relative to adjusting element 34 such that it may be adjusted without play using a not-shown nut screwed onto neck 35 or using any other type of fastening means.

A rotary knob 39 with an external knurl is screwed onto neck 35. A scale ring 40, which may be adjusted to zero relative to rotary knob 39, and which is subdivided into tenths of millimeters and/or 1/256ths of an inch, is inserted between rotary knob 39 and housing upper piece 1.

A long spring 41 is located inside main column 17. Long spring 41 is supported on base plate 15 and against adjusting element 34. Spring 41, which is designed as a compression spring, ensures that motor housing 1, 2 is lifted relative to base plate 15 when clamping screw 22 is open, so that a milling tool inserted in motor spindle 4 emerges from the work piece. Compression spring 41 is supported against adjusting element 34, with a disk 42 having a central projection 43 inserted between them. In the exemplary embodiment shown, projection 43 is designed as a ball inserted in disk 42. It rests in the center of the base of adjusting element 34. To this end, adjusting element 34—which is otherwise preferably made of plastic—may be reinforced with, e.g., an intermediate metal ply. A mandrel 44 extends downward and away from disk 42 and into compression spring 41; it prevents compression spring 41 from collapsing.

Figure 2:
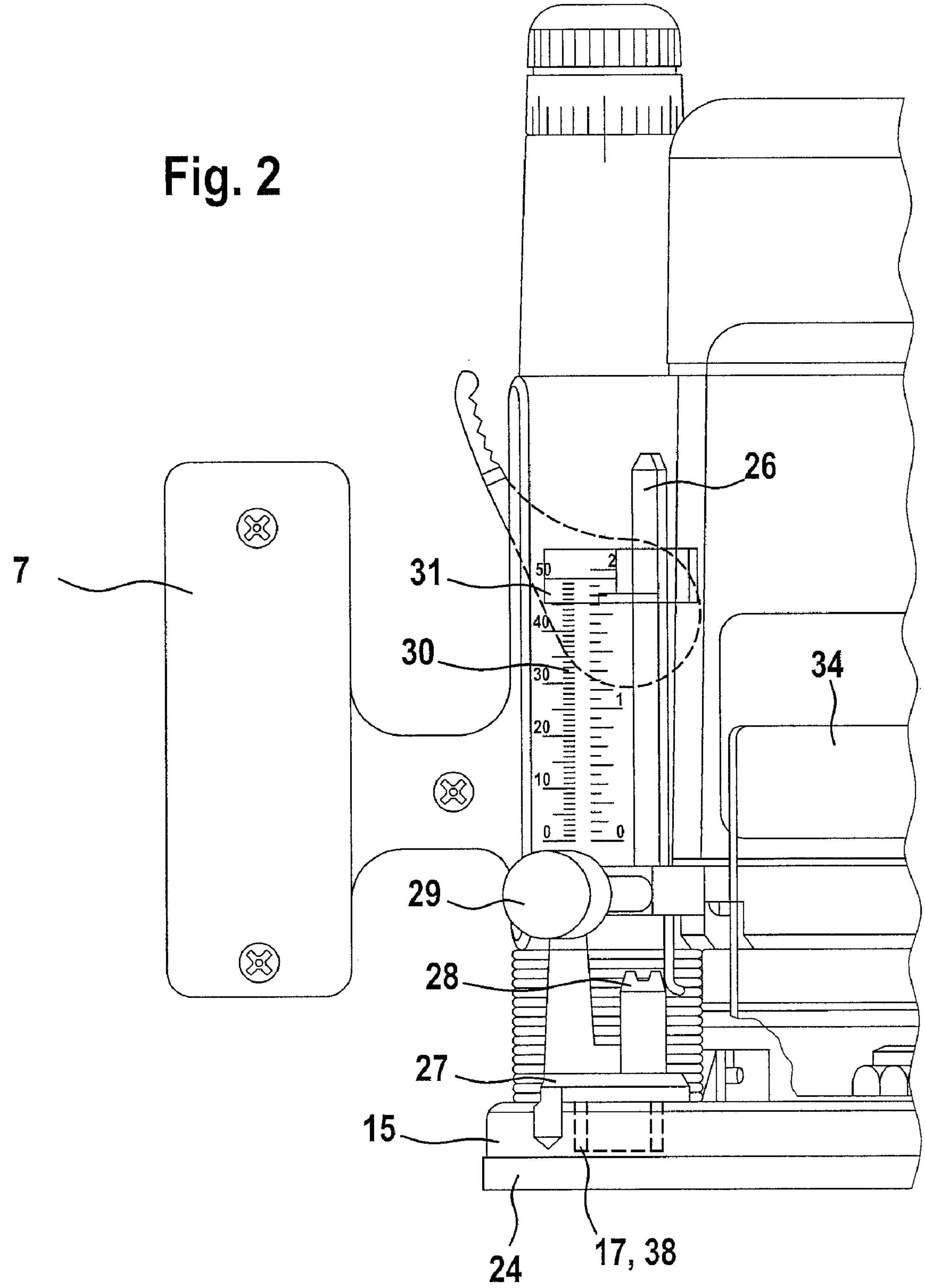
FIG. 2 shows a partial view of the router according to the present invention with a device for making rough adjustments of the milling depth.

The milling depth of the router is adjusted as usual, using rod 26 and rotary plate 27, as shown in FIG. 2. In practical application, it often becomes apparent that the milling depth was adjusted too low or too flat by a small amount, e.g., fractions of millimeters. Since it is not possible to make such a small correction via the rough adjusting using rod 26, a device for making fine adjustments is also provided. The correction required may be brought about by using the device or by making fine adjustments with the milling tool inserted in the work piece, without changing the rough setting of the milling depth.

When rotary knob 39 is rotated, the milling depth is changed by the amount indicated in tenths of millimeters on scale ring 40. The resultant rotation of adjusting element 34 relative to clamping sleeve 21 fixedly connected with main column 17 and, therefore, base plate 15, results in motor housing 1 and 2—which is displaceably accommodated on guide columns 17, 18 in two bearings 19, 20—being raised or lowered slightly, depending on the direction of rotation of rotary knob 39.

According to the present invention, at least one bearing 19, 20 is designed at least partially as a rolling element guide. The rolling elements may be balls, rollers, or other rolling elements. The rolling element guide may be a linear guide, a circulation guide, or a guide without circulation. A circulation guide includes rolling elements, which circulate in an endless rolling element circulation. In the present exemplary embodiment, first bearing 19 on solid main column 17 includes two rolling element guides 45 located one on top of the other, although a long rolling element guide would be feasible as an alternative. Second bearing 20 on solid guide column 18 includes a rolling element guide 46 and a sliding guide 47. Other alternatives are also feasible, however.

It will be understood that each of the elements described above, or two or more together, may also find a useful application in other types of constructions differing from the type described above.

While the invention has been illustrated and described as embodied in a router, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A router, comprising a drive; a base body;

a motor housing; a tool fitting for a milling tool, said tool fitting extending from an underside of said motor housing and connected with said drive; and a guide unit including at least two guide columns; wherein said motor housing is accommodated on the guide unit such that the motor housing is displaceable in a displacement direction relative to the base body, the motor housing being displaceably accommodated on a first one of said guide columns in at least one first bearing and on a second one of said guide columns in at least a second bearing, at least one of said bearings being configured at least partially as a rolling element, wherein said first bearing of said guide unit includes two rolling element guides located one on top of the other in the displacement direction of the motor housing.

2. A router as defined in claim 1, wherein said second bearing of said guide unit includes a rolling element guide.

3. A router as defined in claim 2, wherein said rolling element guide of said second bearing is configured as a circulation guide.

4. A router as defined in claim 2, wherein said rolling element guide of said second bearing is configured as a linear guide.

5. A router as defined in claim 1, further comprising rolling elements which are configured as balls.

6. A router as defined in claim 1, further comprising rolling elements which are configured as rollers.

7. The router as defined in claim 1, wherein the base body is configured as a base plate having a central opening, into which the drive extends at least partially.

8. A router, comprising a drive; a motor housing; a tool fitting for a milling tool, said tool fitting extending from an underside of said motor housing and connected with said drive; and a guide unit including at least two guide columns—for said motor housing which is displaceably accommodated on a first one of said guide columns in at least one first bearing and on a second one of said guide columns in at least a second bearing, at least one of said bearings being configured at least partially as a rolling element, wherein said second bearing of said guide unit includes a rolling element guide and a sliding guide.

* * * * *